June 24, 1958   J. A. CHAMBERLIN ET AL   2,839,947
SHOCK-RESPONSIVE INERTIA MECHANISM
Filed Jan. 3, 1956
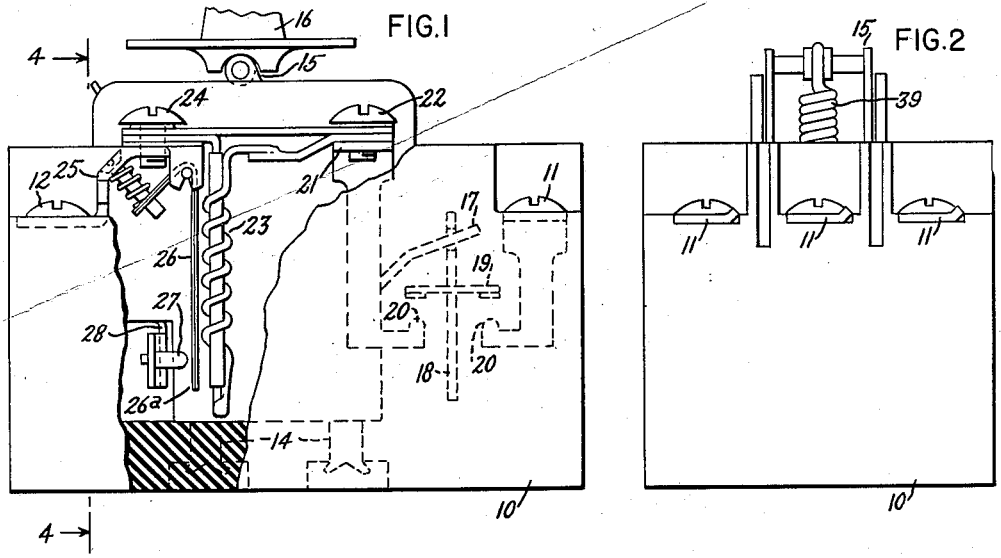
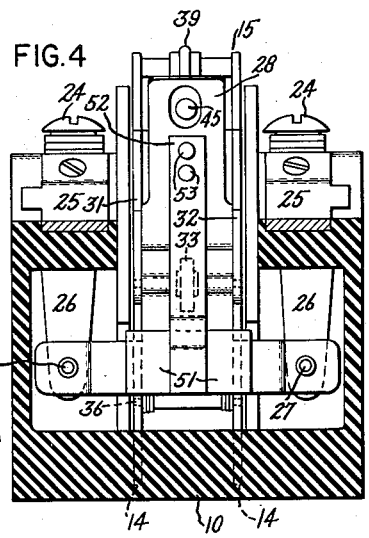
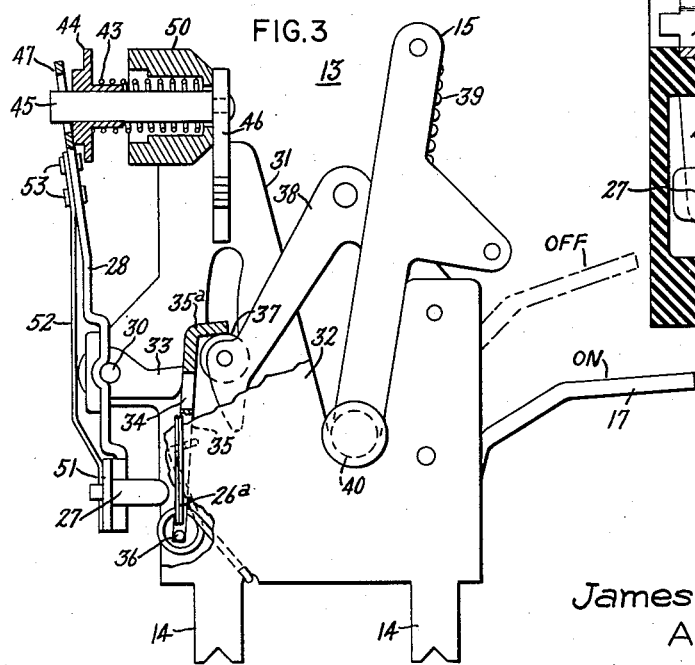
Inventors:
James A. Chamberlin,
Alva L. Sweet,
by Raymond A. Miles
Their Attorney.

United States Patent Office 2,839,947
Patented June 24, 1958

2,839,947

SHOCK-RESPONSIVE INERTIA MECHANISM

James A. Chamberlin and Alva L. Sweet, Schenectady, N. Y., assignors to General Electric Company, a corporation of New York Application January 3, 1956, Serial No. 556,956

8 Claims. (Cl. 74—527)

Our invention relates to shock-responsive inertia mechanism, and particularly to inertia mechanism for shockproofing devices having operating mechanisms of the type utilizing a pivoted or rotatable control member that otherwise might be subject to false operation due to shock.

Many automatic condition responsive devices in common use have an operating mechanism of this type; for example, the tripping mechanism of automatic circuit breakers and the operating mechanism of circuit protective relays or the like that are intended normally to respond only to abnormal circuit conditions but are liable to operate falsely under shock conditions. In some service the sock-responsive characteristic of such an automatic operating mechanism may be of utmost importance. Thus, to be acceptable for some critical installations, as, for example, on naval vessels and the like, any automatic device of the character indicated is required successfully to pass certain specified very severe shock tests. Also, any shockproofing mechanism embodied in such device must not vary the sensitivity of response to the intended abnormal condition, and furthermore, must be self-restoring after the shock subsides, so as not to interfere with the subsequent normal automatic operation of the device.

As shock vibrations or oscillations may originate from diverse directions, the operating mechanism of an automatic device under shock test must be capable of withstanding the specified severe shock applied separately in the three principal $x, y, z$ coordinate directions. Thus, the device may successfully withstand the specified severe test shock applied in a certain direction, without false operation, but fail when the specified test shock is applied in some more vulnerable directions.

Various forms of shockproofing mechanism have been proposed heretofore, and some have been used to some extent. But generally, their complications in structure, difficulties of application due to increased space requirement, as well as their apparent lack of effectiveness upon a severe shock in some vulnerable directions, still leave much to be desired.

Hence, one of the principal objects of the present invention is to provide an improved compact and simplified form of shock-responsive inertia mechanism that can be easily applied to bias a pivoted or rotatable operating member of an operating device to rotate in a predetermined nonoperating direction in response to shock in the most vulnerable directions, and still produce negligible interference with the normal operation of the member.

Another object is to provide an improved direction compensated shockproofing mechanism having a pair of relatively movable inertia elements diversely oriented to respond most effectively to shock applied in different directions, and coordinated so as jointly to cooperate in effectively shockproofing the operating mechanism of an automatic device under shock applied in all required directions.

In some respects, the present invention provides improvements upon the pendulum type of shock-responsive mechanism, disclosed and claimed in the Favre Patent 2,467,200 that is assigned to the assignee of the present invention. This Favre patent discloses an inverted pendulum weight that is supported for shock produced gyratory or limited universal tilting movement in diverse directions from an axis that is shown tilted with respect to the axis of the trip-shaft of a circuit breaker. A blocking member is rendered effective upon a sufficient gyratory or limited tilting movement of the pendulum weight in any direction for blocking the rotation of the trip-shaft of the circuit breaker in the operating direction. However, it is often difficult to find sufficient space to accommodate a shock-responsive mechanism such as disclosed in the Favre patent. Moreover, unless properly oriented, the Favre pendulum weight might fail to tilt or gyrate sufficiently in response to a shock applied in some vulnerable directions, for example, a shock applied in either direction along the gyratory axis of the pendulum weight.

Such possible difficulties may be effectively overcome in accordance with the present invention by providing improved means for shockproofing a rotatable member subject to shock comprising a relatively movable inertia element normally in shock-transmitting relation with the rotatable member on one side of the axis thereof. Such shock-transmitting relation will produce a so-called "billiard ball action" when the rotatable member is subject to a sudden severe shock in any direction tending to propel the inertia element either toward or away therefrom. In the first case, the transmitted shock will tend directly to bias the rotatable member to rotate in a predetermined direction, i. e., the nonoperating direction. To take care of the second case, in accordance with the present invention, the movable inertia element is provided with a tension-transmitting connection attached to the rotatable member on the other side of the axis so as to extend across the axis. Consequently, when a sufficient shock is transmitted from the rotatable member to the relatively movable inertia element to propel the inertia element rapidly away from the rotatable member, the tension-transmitting connection that is attached to the rotatable member on the other side of the axis becomes effective to transmit a tension force that will bias the rotatable member to rotate in the same predetermined non-operating direction. Furthermore, when the tension-transmitting connection is in the form of a light strip spring, the relatively movable inertia element may act like a pendulum and oscillate into and out of contact with the rotatable member in response to a very severe shock. But no matter in which direction the relatively movable inertia pendulum element is moving, the resultant alternate impact or tension force always tends to bias the rotatable member in the predetermined nonoperating direction with a force that will increase as the intensity of the shock increases. But normally when the shock subsides, the inertia element will then move jointly with the rotatable member and hence impose negligible interference with the sensitivity.

In case the operating mechanism of an automatic device is designed so that it is vulnerable to shock only in some predominant directions, then the improved oscillating pendulum inertia element of the present invention may be applied to effectively shockproof such device, However, the most effective over-all shockproofing for all directions may be obtained by providing a shockproofing mechanism including a pair of relatively movable inertia elements, diversely mounted and oriented so that one can operate on the tilting pendulum blocking principle of the Favre patent and the other on the "billiard ball" double-action biasing principle provided by the present invention, since the two inertia elements can then cooperate on diversely oriented axes so as to be selectively responsive to shock in any direction. In this way each can augment as far as possible the effectiveness of the other, to produce the maximum shockproofing of the device.

The improved operating principles and advantages provided by the present invention will be more fully appreciated by referring to the following detailed specification, taken in conjunction with the accompanying drawings, wherein Fig. 1 is a side view, partly broken away, of a typical three-phase motor starting switch unit having the improved shock responsive inertia mechanism of the present invention embodied therein for shockproofing purposes. Fig. 2 is an end view of the switch unit shown in Fig. 1. Fig. 3 is a side view of the trip-free snap action manual and automatic overload contact operating mechanism removed from the switch unit with certain parts broken away in order more clearly to reveal the details of the automatic tripping and shockproofing elements. Fig. 4 is a cross-sectional view on the line 4—4 of Fig. 1 showing more clearly the operating relation of the overload responsive bimetal elements and shockproofing elements with the rotatable tripping member.

In the typical form shown in Fig. 1, the three-phase manual and automatic overload protective motor starting switch unit comprises a generally rectangular molded casing 10 having three line terminals 11 mounted in alignment at one end thereof and three motor connection terminals 12 similarly mounted at the other end thereof. A well-known form of trip-free manual and automatic overload snap action contact-operating mechanism indicated generally by the numeral 13 in Fig. 3 is mounted in a central recess formed in the molded casing 10 and staked in position by the riveted over feet 14. This mechanism is provided with an operating and reset lever 15 that may be engaged by a sliding operating handle 16 so as to operate the overcenter spring snap action toggle mechanism to move the contact-operating arm 17 between the "on" position in which it is shown in Fig. 3 and the "off" position indicated by the dotted lines when the operating lever 15 is moved in opposite directions. The particular structure of the overcenter toggle switch operating mechanism 13 forms no part of the present invention and hence is not shown in detail.

However, it may be noted that the operating arm 17 extends through an opening in the sliding insulating barrier 18 which carries three bridging contacts 19, aligned in a row, into and out of circuit closing engagement with the three pairs of stationary contacts 20 that are also aligned in a row. As shown, one of the outer pair of contacts 20 is electrically connected to the outer one of the line terminals 11, and the other contact 20 is electrically connected to a nut insert 21 for the mounting screw 22 for one terminal of the removable electric overload heater 23. The other terminal of the heater 23 is removably connected by means of the screw 24 to the conducting bracket 25 extending from the motor terminal screw 12. The bracket 25 carries a bimetal element 26 that is heated by the heater 23 to provide an inverse time tripping characteristic. In order to calibrate the time delay overload tripping response, the bimetal element 26 is adjustably mounted to vary the distance between its free end 26a and the insulating pin 27 projecting from the pivotally mounted or rotatable operating member 28 that is constructed to control the automatic tripping of the contact operating mechanism 13 in the following manner.

As may be seen in the broken away portion of Fig. 3, the rotatable tripping control member 28 is pivotally mounted by means of the pin 30 that rotates in suitable bearing holes formed in the spaced apart parallel side plates 31 and 32 of the operating mechanism 13. The headed trip finger 33 is secured by pin 30 in interlocking relation with the rotatable control member 28 to move as a unit therewith to engage or disengage the rounded cam end of the trip finger 33 with the upper edge of the slot 34 formed in the latch member 35 that is pivotally mounted on the pin 36. As long as the cam end of trip finger 33 remains in engagement with the upper edge of the slot 34 as shown in Fig. 3, the bent-over end 35a of latch 35 will be locked in engagement with the roller 37 that is carried at the end of the toggle link element 38 of the operating mechanism 13 having the spring 39 thrown each way overcenter as the operating lever 15 is oppositely rotated about its pivotal bearings 40.

The rotatable control member 28 is biased by spring 43 to the position in which it is shown in Fig. 3, wherein the upper end 47 rests against the molded housing 10 and the trip finger 33 is in holding engagement with the upper edge of the slot 34. The spring 43 engages with the disk member 44 having a hub that freely slides along the pin 45 extending from the supporting plate 46 secured between the side plates 31 and 32 of the operating mechanism.

In order to shockproof the operating mechanism 13 in accordance with the present invention a pair of relatively movable inertia elements 50 and 51 are diversely oriented with respect to the axis of the rotatable member 28 and coordinated so as jointly to cooperate in controlling the movement of the rotatable member in the clockwise or operating direction under shock conditions. The inertia element 50 as shown is of a generally bell-shaped form with the pin 45 extending through an enlarged opening in the closed end of the bell so as to permit limited gyratory or tilting movement thereof in any direction in response to shock. Normally the bell-shaped inertia element 50 is biased by the spring 43 into contact with the supporting plate 46 with the rim of the bell substantially equidistant from the fixed pin 45 as shown in Fig. 3. In this way the normal axis of the swinging or pendulum like inertia element 50 is disposed perpendicular to a plane passing through the axis of pin 30 upon which the member 28 is rotatably mounted.

The inertia element 51 is supported by a relatively light strip spring 52 having one end secured to the rotatable control member 28 by suitable rivets 53 on one side of the axis 30 so that the inertia element 51 is lightly biased into shock-transmitting contact with the rotatable member 28 on the other side of the axis 30 as shown in Fig. 3.

*Operation*

Under normal conditions when there is no shock, the bell-shaped inertia element 50 will remain stationary in the position in which it is shown in Fig. 3, and the spring supported inertia element 51 can move jointly with the rotatable control member 28 to impose negligible interference with sensitivity. Thus in case the bimetal element 26 becomes heated sufficiently by the heater 23 to flex the lower end 26a thereof into engagement with the insulating pin 27, the control member 28 will thereby be rotated about the pin 30 against the bias of spring 43 and move the cam end of trip finger 33 until it clears the edge of the slot 34. Thereupon the force of spring 39 acting on the toggle arm 38 roller 37 will cause the latch member 35 to rotate in the counterclockwise direction to release the roller 37. Thereupon the toggle mechanism will operate the contact operating arm 17 from the "on" position to the "off" position with a snap action to disengage the bridging contacts 19 from the stationary contacts 20 and thereby interrupt the circuit. When the bimetal element 26 has cooled, so as to disengage the pin 27, all the operating parts may be reset into their initial positions by means of the operating and reset lever 15.

Whenever the operating mechanism 13 is subjected to shock, unless prevented by one or both of the inertia elements 50 and 51, the rotatable control member 28 may tend to rotate in the operating direction an amount depending upon the severity of the shock. Thus, in the absence of the inertia elements 50 and 51, the shock produced rotation of control member 28 might become sufficient to carry the cam end of the finger 33 over the edge of the slot 34 and thereby produce false operation of the mechanism 13 to open the circuit controlling contacts 19. This might also result from vibration of the free end of the bimetal element 26 under severe shock conditions except for the shockproofing action of the inertia elements 50 and 51.

In response to shock, the bell-shaped inertia element 50 can gyrate or tilt in any direction so as to bring the rim of the member into position to block the disk 44 and thereby prevent sufficient rotation of the rotatable member 28 in the operating direction to disengage the cam end of finger 33 from the edge of slot 34.

Also, in response to shock the inertia element 51 due to the so-called "billiard ball action" when the shock is transmitted either through the bimetal element 26 or latch 33, or from case 10 or from the side frames 31 and 32 through the pivot pin 30 of the rotatable control member 28, may rapidly propel the inertia element 51 either towards or away from the rotatable member 28. In the first case, the transmitted shock will directly bias the control member 28 in the nonoperating direction. In the second case the resulting relative movement of the inertia element 51 will transmit tension through the spring 52 to its point of attachment on the other side of the axis 30 of the rotatable member 28. Consequently, the force exerted by the transmitted tension will serve to bias the rotatable control member 28 to rotate in the nonoperating direction. Upon any rebound of inertia element 51, the re-engagement thereof with the rotatable member 28 on the other side of the axis will likewise tend to bias the control member 28 to rotate in the nonoperating direction. Thus, upon any relative movement of inertia element 51 in either direction, the biasing action is always in the same direction.

Due to the diverse orientation of the relative movements of the inertia elements 50 and 51, each can respond most effectively to shock applied in certain directions and in this way the pair of elements can be coordinated to cooperate in most effectively shockproofing the operating mechanism 13 against test shocks applied in all required directions. However, if desired, the inertia element 51 may be used alone in any case where it is only necessary to provide for shockproofing a rotatable control member in the most vulnerable directions.

Although in accordance with the provisions of the patent statutes this invention is described as embodied in concrete form and the principle of the invention has been described together with the best manner in which it is now contemplated applying that principle, it will be understood that the description is merely illustrative and that alterations and modifications will readily occur to persons skilled in the art without departing from the true spirit of the invention or from the scope of the annexed claims.

What we claim as new and desire to secure by Letters Patent of the United States, is:

1. In a device having a rotatable member subject to shock, means including a relatively movable inertia element normally in shock-transmitting relation with the rotatable member on one side of the axis thereof and having a tension-transmitting connection attached to the rotatable member on the other side of said axis to bias the member to rotate in a predetermined direction upon a sudden relative movement of the inertia element in response to shock.

2. A device having in combination a rotatable member subject to shock, a relatively movable inertia element, means for normally mounting the inertia element to rotate jointly with the rotatable member in shock-transmitting contact therewith on one side of the axis, thereof, and a tension-transmitting connection extending from the inertia element and attached to the rotatable member on the other side of said axis to bias the member to rotate in a predetermined direction upon a sudden relative movement of the inertia element in response to shock.

3. In combination, a device having a reversely rotatable member subject to shock, and means including an oscillatable inertia element having a shock-transmitting connection with the rotatable member on one side of the axis thereof and provided with a tension-transmitting connection to the member on the opposite side of the said axis for biasing the member to rotate in a predetermined direction upon oscillation of the inertia element due to shock.

4. A device having a rotatable member subject to shock and having a relatively movable inertia pendulum attached to the rotatable member on one side of the axis thereof to extend normally into shock transmitting contact with the member on the other side of said axis for biasing the member to rotate in a predetermined direction upon relative movement of the inertia pendulum due to shock.

5. In combination, an automatic device having a rotatable operating member subject to shock, condition-responsive means for rotating the member in the operating direction, an inertia element having a supporting spring attached to the rotatable member on one side of the axis thereof to support the inertia element in shock-transmitting contact with the member on the other side of said axis to bias the member to rotate in the nonoperating direction upon a sudden relative movement of the inertia element in response to shock.

6. In a device having a rotatable member subject to shock, a relatively movable inertia element having a supporting spring attached to the rotatable member on one side of its axis of rotation and extending transverse to said axis to support said inertia element in contact with said member on the other side of said axis to bias said member to rotate in a predetermined direction upon a sudden relative movement of the inertia element in response to shock.

7. In combination, a device subject to shock and having a rotatable operating member and means for shock-proofing the device including a pair of relatively movable inertia elements, one of said elements having mounting means for supporting the one inertia element on the device for shock produced limited universal tilting in diverse directions from an axis extending transverse the axis of the rotatable member, and blocking means rendered effective upon the limited tilting movement of the one element in each direction for blocking the rotation of the operating member in the operating direction, and the other of said inertia elements having a tension-transmitting connection attached to the rotatable member on one side of the axis thereof for supporting the other inertia element in shock-transmitting contact with the rotatable member on the other side of said axis of said rotatable member to bias said member to rotate in the nonoperating direction upon a sudden relative movement of the other inertia element in response to shock.

8. In combination, a device subject to shock and having a rotatable member and means for shockproofing the device including a pair of diversely oriented relatively movable inertia elements, one having means for mounting the one element on the device for shock-produced, substantially universal, tilting movement from an axis normal to a plane through the axis of the rotatable member, and having means effective upon shock-produced tilting movement of the one element in substantially any direction for blocking movement of the rotatable member in the operating direction, and the other relatively movable inertia element having a tension-transmitting support attached to the rotatable member and extending transverse the axis thereof for biasing the member to rotate in the nonoperating direction upon shock-produced relative movement of the other inertia element.

References Cited in the file of this patent

UNITED STATES PATENTS 2,467,200     Favre _____ Apr. 12, 1949